United States Patent [19]
Dobinson et al.

[11] 3,926,887
[45] Dec. 16, 1975

[54] PROCESS FOR PREPARING SPINNING SOLUTIONS

[75] Inventors: Frank Dobinson, Gulf Breeze; Chris A. Pelezo, Pensacola, both of Fla.

[73] Assignee: Monsanto Company, St. Louis, Mo.

[22] Filed: June 17, 1974

[21] Appl. No.: 480,089

Related U.S. Application Data

[60] Division of Ser. No. 363,456, May 24, 1973, Pat. No. 3,842,026, which is a continuation-in-part of Ser. No. 273,069, July 19, 1972, abandoned.

[52] U.S. Cl.... 260/29.2 N; 260/30.2; 260/32.6 NA; 260/33.4
[51] Int. Cl.². ... C08J 3/06; C08K 5/20; C08K 5/34; C08L 79/06
[58] Field of Search.. 260/78 TF, 32.6 NA, 32.6 NT, 260/30.2, 29.2 N

[56] References Cited
UNITED STATES PATENTS

| | | | |
|---|---|---|---|
| 3,238,183 | 4/1966 | Frazer | 260/78.4 |
| 3,376,276 | 2/1968 | Pruckmyr | 260/78 R |
| 3,642,707 | 2/1972 | Frazer | 260/78 TF |
| 3,644,297 | 2/1972 | Sekigucki | 260/78 R |
| 3,842,028 | 10/1974 | Dobinson et al. | 260/32.6 NA |

*Primary Examiner*—Allan Lieberman
*Attorney, Agent, or Firm*—John W. Whisler

[57] ABSTRACT

A polymer spinning solution in N,N-dimethylacetamide and/or N-methylpyrrolidone, as solvent, of a high molecular weight polymer consisting essentially of recurring units of which at least 90 mole percent are of the formula

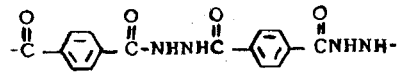

and 2 to 7% by weight, based on the weight of solvent, of lithium chloride. The solution is prepared by reacting, for example, terephthaloyl chloride and terephthalic dihydrazide in the solvent containing lithium chloride at a temperature between −15°C. and 100°C. under conditions of high-speed stirring or shearing until a gel is formed; adding a small amount of water or organic hydroxylic compound to this gel; and further high-speed stirring until a clear solution is formed. The solutions are extrudable into fibers of high tensile strength which are useful as reinforcing elements in composites, such as plastic and rubber composites.

8 Claims, No Drawings

PROCESS FOR PREPARING SPINNING SOLUTIONS

CROSS-REFERENCE TO RELATED APPLICATION

This is a division of application Ser. No. 363,456 filed May 24, 1973, now U.S. Pat. No. 3,842,026, which is a continuation-in-part of application Ser. No. 273,069, filed July 19, 1972 and now abandoned.

DESCRIPTION OF THE PRIOR ART

Spinning solutions consisting of poly(terephthalic hydrazide) dissolved in dimethyl sulfoxide containing lithium chloride (DMSO/LiCl) and fibers shaped therefrom are known from U.S. Pat. Nos. 3,536,651 and 3,642,707. These solutions are prepared by a stepwise process in which the polyhydrazide is: first, prepared in an amide solvent by the conventional low-temperature solution polymerization process, then isolated from this solvent medium, collected, washed, dried, and finally, dissolved in DMSO/LiCl.

It is generally considered desirable to prepare polymer spinning solutions by a coupled process, i.e., a process in which the polymerization solvent also serves as the spinning solvent. The advantages of this process over the stepwise process are obvious, e.g., less time consuming, less expensive and more convenient. However, attempts to prepare spinning solutions containing at least about 4% by weight of poly(terephthalic hydrazide) by a coupled process, have not heretofore been successful. It is believed that the reason for this lack of success is due mainly to the apparent lack of solubility of the polyhydrazide in any of the solvents used in connection with its preparation, e.g., the amide solvents. DMSO/LiCl cannot safely be used as a polymerization solvent for polyhydrazides, as severe explosive reactions have been reported between DMSO and aryl chlorides.

An object of the present invention is to provide a coupled process for the preparation of novel spinning solutions of film- and fiber-forming polymers consisting essentially of at least 90 mole percent of repeating units of the formula

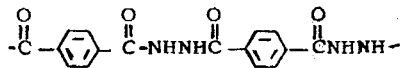

wherein said solution is characterized in that it contains at least about 3.0 percent by weight of said polyhydrazide.

SUMMARY OF THE INVENTION

The present invention provides a coupled process for the preparation of a spinning solution on a polymer consisting essentially of recurring structural units of which at least 90 mole percent thereof are of the formula

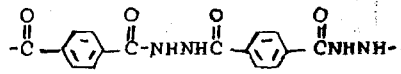

The process comprises: reacting selected polymer-forming monomers, hereinafter described, in a solvent selected from N,N-dimethylacetamide (DMAc); N-methylpyrrolidone-2-(NMP), or mixtures thereof, wherein the solvent contains between 2 and 7% by weight of dissolved lithium chloride, at temperatures between −15° and 100°C. under conditions of high-speed stirring or shearing until a gel is formed; adding a small amount of water or organic hydroxyl compound to this gel; and further high-speed stirring of the gel until a clear polymer solution, i.e., dope, is obtained.

The spinning solutions of the present invention are characterized in having a viscosity between 1,000 and 40,000 poise, preferably 2,000 to 10,000 poise, and containing at least 3% by weight of a said polymer having an inherent viscosity of at least 3.0. Fibers shaped from these solutions have high tensile properties and are useful as reinforcing elements in the reinforcing of materials such as plastic and rubber composites.

DESCRIPTION OF THE PREFERRED EMBODIMENTS

The process of the present invention provides polymer spinning solutions by a coupled process, whereas heretofore spinning solutions of polymers of this type were prepared only by a stepwise process. Solutions prepared by the process of this invention contain at least 3.0% and, preferably, 4% to 10% or more by weight of a polymer having an inherent viscosity of at least 3.0.

A preferred spinning solution of the present invention is a solution of poly(terephthalic hydrazide) formed by reacting substantially equimolar amounts of terephthaloyl chloride (TCl) and terephthalic dihydrazide (TDH) in DMAc containing 5% LiCl under the conditions described herein.

It is contemplated that, up to 10 mole percent of the terephthalic dihydrazide reactant may be replaced with at least one other reactant selected from the group consisting of

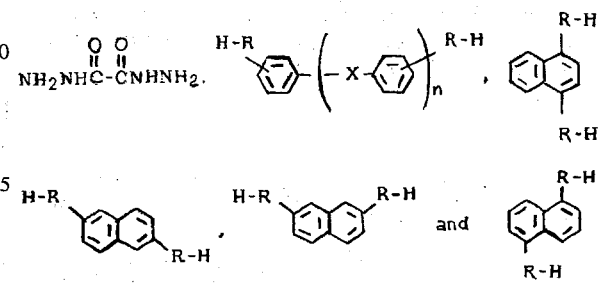

wherein each phenylene radical (i.e.

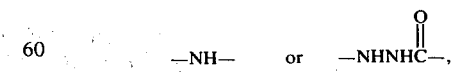

is a meta- or para-phenylene radical, each R is $$-NH- \quad \text{or} \quad -NHNH\overset{O}{\underset{\|}{C}}-,$$

$n$ is zero or one and X is a covalent bond or a divalent radical selected from the group consisting of

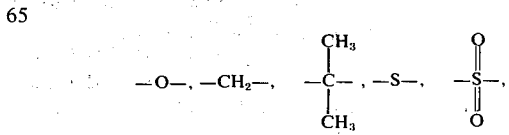

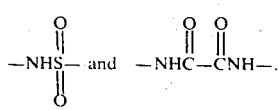

Reactants of this description are either diamines, dihydrazides or amino-hydrazides. Examples of these reactants include:

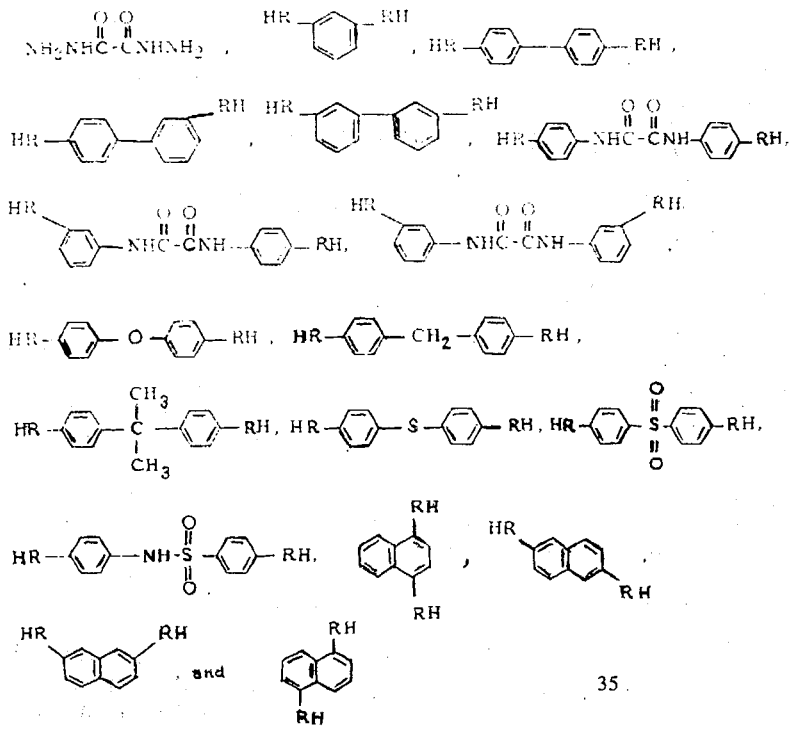

wherein R has the same meaning as previously set forth. Specific examples of reactants that may be used with the TDH reactant are:

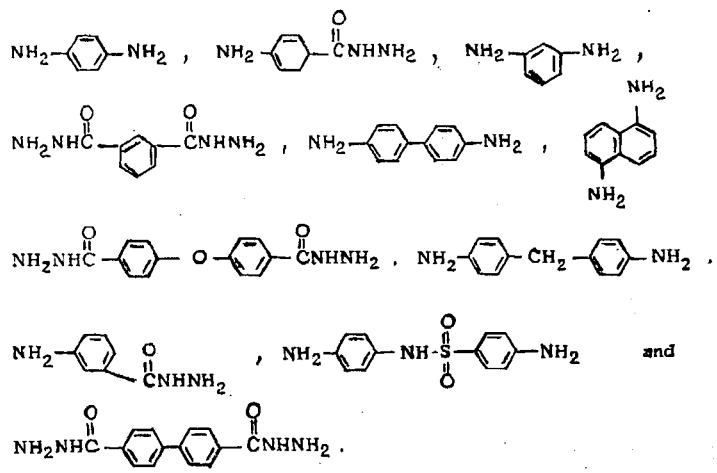

The reactants used in carrying out the invention may contain ring substituents that are inert under the reaction conditions employed, for example, a chlorine or bromine atom or a methyl group.

The polymers of the spinning solutions described herein and prepared from the above-described reactants may be represented by the formula

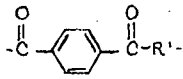

wherein R' is a radical selected from the group consisting of

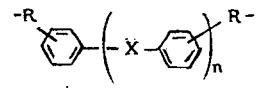

and combinations thereof, wherein each phenylene radical is a or

radical and X, R and n has the same meaning as previously set forth, with the proviso that at least 90 mole percent of said R' radicals are of the formula

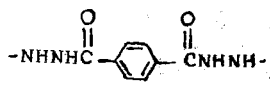

Polymers of the foregoing description include the homopolymer, poly(terephthalic hydrazide), having recurring units of the formula

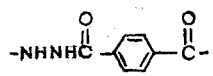

and copolymers in which at least 90 mole percent of the copolymer recurring units are of the formula

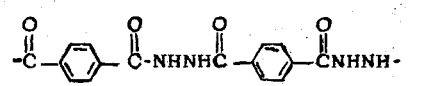

Preferred polymers described herein are those prepared from either (1) oxalic dihydrazide, 4,4'-methylene dianiline, para-phenylene diamine, meta-phenylene diamine, isophthalic dihydrazide or mixtures thereof, (2) terephthalic dihydrazide and (3) terephthaloyl chloride, wherein the mole ratio of (3) to (1) + (2) is 1 and the mole ratio of (1) to (2) is from 1:9 to 0:10. A particularly preferred polymer is poly(terephthalic hydrazide).

Sufficient amounts of monomers are used in carrying out the process to provide a polymer solution having a viscosity between 1,000 and 40,000 poise and containing at least about 3% by weight polymer and, preferably 4% to 10% and higher. The viscosity of the solution must be at least 1,000 poise in order to be extrudable through spinneret orifices. Preferably, the viscosity of the spinning solutions is in the range of from about 2,000–6,000 poise. The polymer concentration of the spinning solution is at least about 3% by weight. At lower polymer concentrations the process becomes commercially unattractive due to the large amount of solvent involved in terms of pounds of fiber produced. The concentration of polymer in the spinning solutions is preferably as high as possible without adversely affecting the extrudability of the solution, fiber properties and the like.

The process of this invention provides a commercially attractive process for producing fiber of the polymers described herein. Also, polymers produced by the process of this invention have higher intrinsic viscosities than do the corresponding polymers produced by prior art processes, and therefore are spinnable into fiber having improved tensile properties, e.g., higher tenacities.

Solvents that may be used in carrying out the process of the invention are N,N-dimethylacetamide (DMAc), N-methylpyrrolidone-2, or mixtures thereof. Lithium chloride (LiCl) is added to the solvent in an amount ranging from 1 to 7% by weight, preferably about 5% by weight, to increase the solvent power thereof. A preferred solvent is DMAc containing 5% by weight of LiCl.

In a preferred embodiment of the invention, the process is carried out by adding selected amounts of terephthalic dihydrazide to DMAc/5% LiCl, warming the slurry to effect solution and cooling the resulting solution to a temperature between about 0° and about 30°C., e.g. 25°C. A small amount of a chain terminator, i.e. viscosity stabilizer, such as benzhydrazide is added, if desired. Then, a substantially equimolar amount of terephthaloyl chloride (TCl), based on the amount of terephthalic dihydrazide used, is added all at once. The mixture is maintained at room temperature while it is stirred by stirring means rotating at between 400 and 700 rpm. Stirring is started immediately after addition to the TCl. An opalescent, thick dope is formed to which a small amount of water containing lithium hydroxide is added, if desired, followed by further addition of water. Continual stirring of this mixture at from 400–700 rpm produces a bright, clear, stable polymer dope. Addition of water or organic hydroxylic compound (1 to 4% by total volume) enables a clear solution to form. Examples of organic hydroxylic compounds that may be used include methyl, ethyl or isopropyl alcohol and ethylene glycol. Lithium hydroxide or lithium carbonate may then be added, if desired, in an amount up to that sufficient to neutralize the HCl formed during polymerization.

It is essential to the preparation of the polyhydrazide solutions described herein that there is sufficient mixing of the reaction mixture, both during and after polymerization, to keep the polymer in solution. Naturally, the severity of the mixing required to attain the solutions will vary with conditions employed, e.g., temperature, polymer concentration, polymer structure, stirring time, etc. However, the severity of mixing may be easily determined by experimentation. Means other than stirring may be employed to achieve the required mixing of the reaction mixture during preparation of the solutions. It has generally been found that adequate mixing of the reaction mixture is attained by utilizing, as the stirring means, a helical stirrer attached to a high-torque, high-speed motor capable of producing 400–700 rpm.

In view of the teachings in the prior art, it is indeed surprising to discover that useful N,N-dimethylacetamide spinning solutions of the polymers described herein can be attained. In U.S. Pat. No. 3,130,182 only wholly aromatic polyhydrazides wherein less than 65 percent of the arylene groups are p-phenylene are described. An article by A. H. Frazer and F. T. Wallenberger published in 1964 in the *Journal of Polymer Science*, Part A, Volume 2, pages 1147–1156, describes the preparation of several aromatic polyhydrazides using hexamethyl phosphoramide or N-methyl pyrrolidone as solvents, the latter containing 5% dissolved lithium chloride. Fiber properties are described only for compositions containing 50% and 100% m-phenylene structures. In U.S. Pat. No. 3,536,651, already cited, terephthalic dihydrazides and terephthaloyl chlorides are reacted in hexamethylphosphoramide containing 10% by weight of lithium chloride to yield a reaction mixture containing only about 2% by weight of polyhydrazide. The polymer is isolated and dissolved in DMSO/LiCl to provide a spinning solution. No mention is made of whether the hexamethylphosphoramide/polyhydrazide reaction product is a slurry or a solution suitable for spinning. As is shown in Example 1 below, attempts to prepare 4% solution of poly(terephthalic hydrazide) by conventional techniques failed when N,N-dimethylacetamide/5% LiCl, N-methyl pyrrolidone/5% LiCl, or hexamethylphosphoramide were used as reaction solvents. Example 11 shows that the reaction product of TDH and TCl in hexamethylphosphoramide/10% LiCl, as described in U.S. Pat. No. 3,536,651, already cited, is a slurry or paste unsuitable for direct spinning to fibers.

The particular temperatures used in carrying out the process are not critical providing the temperature does not exceed about 100°C. Generally, temperatures ranging from about 0° to about 60°C. are suitable.

EXAMPLES

In the following examples, inherent viscosities ($\eta$inh) has been determined in accordance with the following equation:

$$\eta inh = \frac{ln\ (\eta_{rel})}{C}$$

wherein $\eta_{rel}$ represents the relative viscosity, C represents a concentration of 0.5 grams of the polymer in 100 ml. of the solvent. The relative viscosity ($\eta_{rel}$) is determined by dividing the flow time in a capillary viscometer of a dilute solution of the polymer by the flow time for the pure solvents; flow times are measured at 25°C.

EXAMPLE 1

This example illustrates that attempts to make poly(terephthalic hydrazide) solution by the low-temperature solution-polycondensation technique as taught in the patent literature and chemical literature for polyhydrazides produce only insoluble pastes.

Terephthalic dihydrazide (TDH) was prepared by refluxing dimethyl terephthalate with a 5-molar excess of hydrazine hydrate in a large volume of toluene. The insoluble product was filtered off and washed with methanol and then washed with methanol and then water. The washed TDH was dried in a vacuum at 80°C.

TDH (1.94g., 0.01 mole) was dissolved in 54g. of DMAc/5% LiCl in a 3-necked pear-shaped flask fitted with a ground-glass stirring rod. The solution was cooled to 0°C. and stirred briskly at about 200 rpm. To the stirred solution was added terephthaloyl chloride (TCL) (2.03g., 0.01 mole). The reaction product quickly became cloudy. There was no buildup of solution viscosity. After two hours the reaction product was a thin slurry.

Similar results were obtained when the DMAc/LiCl was replaced with N-methyl pyrrolidone containing 5% LiCl and with hexamethylphosphoramide containing 10% dissolved LiCl.

EXAMPLE 2

Terephthalic dihydrazide (TDH, 9.7g., 0.05 M) was added to 380 ml dry DMAc containing 5% dissolved lithium chloride in a 2-liter glass vessel fitted with a downwardly driven helical stirrer attached to a high-torque, high-speed motor. The slurry was cooled to 0°C. by means of an ice bath. It was stirred at about 400 rpm. Terephthaloyl chloride (TCL, 10.15g. 0.05M) was added all at once and washed in with about 20 ml DMAc/5% LiCl. After thirty minutes of high-speed stirring, the ice bath was removed. The reaction mixture thickened as the temperature rose. One hour after removal of the ice bath, a clear viscous dope had formed. The dope was not very stable, and as further build-up in molecular weight occurred, the solution became opaque, and polymer fell out of solution as a hard mass.

EXAMPLE 3

Example 2 was repeated except that the ice bath was replaced by a bath containing water at 25°C. Stirring was set at 675 rpm as the TCL was added. Within a brief time, the speed had fallen to 590 rpm. The reaction product became opalescent, and 10 ml water were added. Continued rapid stirring produced a clear, viscous dope.

EXAMPLE 4

Example 2 was repeated, except that 5 ml of water were added at the point that the reaction product became opalescent (17 minutes after addition of the TCL). Continued stirring produced a bright, viscous polymer solution.

The polymer solution was placed in a hollow, stainless-steel spinning vessel. Fibers were spun through a 5-hole, 6-mil spinneret. The filaments were spun through a half-inch air gap into an aqueous spin-bath. Clear, well-collapsed filaments were wound up on a pair of rollers immersed in a wash-bath of DMAc/water (25% DMAc), at such a rate that the filaments were relaxed (net stretch, 0.7 times). The washed fibers then passed through a 2-foot bath of 10% DMAc in water, heated to about 90°C., and over a second set of godet rolls to give a "cascade stretch" of roughly 1.3 times. The fibers were further washed on this second set of rolls by water at 50°C. The fibers were dried. They had the following properties: tenacity, 5.6 g/d; elongation, 15.5%; initial modulus, 157 g/d; toughness, 0.67 gm-cm/denier cm.

A portion of the spinning dope was diluted to 0.5% polymer concentration and used for an inherent viscosity measurement: $\eta_{inh}$ was 8.28.

EXAMPLE 5

This example illustrates that dope stabilization of the solutions of the invention may be effected by a variety of hydroxylic compounds.

TDH (12.13g., 0.0625M), TCL(12.69g., 0.0625M) were reacted as in Example 2 in a total of 400 ml DMAc/5% LiCl, under a high rate of stirring. At the point of opalescence, four portions of the highly viscous dope were removed from the reaction vessel. The portions were stirred, respectively, with roughly 1% by volume of the following compounds:
methyl alcohol
ethyl alcohol
isopropyl alcohol
ethylene glycol
In each case the opalescence disappeared and the dope became clear and bright.

EXAMPLE 6

This experiment illustrates the preparation of a copolymer containing about 95 mole percent of the repeating unit

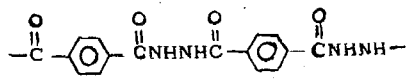

and about 5 mole percent of the following repeat unit

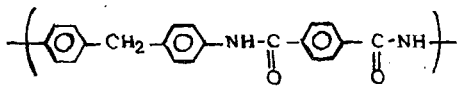

Using the same apparatus as used in Example 2, TDH (11.64g., 0.06M) and 4,4'-methylene dianiline (1.32g., 0.0067M) were added to 450 ml DMAc/5% LiCl.

The reaction mixture, cooled to 0°C., was stirred at about 650 rpm and TCL (13.5g., 0.0667M) was added followed by a rinse of 50 ml DMAc/5% LiCl. Stirring was maintained for 1.5 hours with the ice bath surrounding the reaction vessel and then for a further 30 minutes at room temperature. The solution became opalescent at this point, and 10 ml water were added. Further stirring resulted in a clear polymer solution. Polymer inherent viscosity was 4.98.

Similar results will also be obtained when the above experiment is repeated using either para-phenylenediamine, meta-phenylenediamine, 4,4'-diaminooxanilide or another of the aromatic diamines described herein instead of 4,4'-methylenedianiline.

EXAMPLE 7

The apparatus used was essentially identical with that used in Example 2, except that the resin kettle had a capacity of 500 ml. TDH (12.125 grams, 0.0625 mole) and 0.340 gram of benzhydrazide (4 mole % based on TDH) were dissolved in 400 ml of DMAc/5% LiCl. TCL (12.688 grams, 0.0625 mole) was added all at once and the reaction solution was stirred for 10 minutes with the vessel in a room-temperature bath, and then for 5 minutes in an ice bath. Water (10 ml) containing dissolved lithium hydroxide hydrate (2 grams) and a further 2 ml of water were added with stirring until a clear dope had formed. This dope was transferred to a chilled spinning bomb and stored at 0°C. overnight. Then fibers were spun as described in Example 4, with a jet stretch of 0.6 and a cascade stretch of 1.2. The fibers were hot stretched at 350°C. to give fibers having properties (t/e/m) of 4.4 gpd/2.4%/209 gpd.

EXAMPLE 8

The conditions of Example 7 were repeated exactly except that 0.170 gram benzhydrazide (2 mole % based on TDH) was used to control the molecular weight. A bright, very viscous dope was produced. Fibers were spun as before, using a jet stretch of 1.3 and a cascade stretch of 1.3 and a hot-shoe temperature of 340°C.; fiber properties (t/e/m) were: 5.7 gpd/2.4%/286 gpd.

EXAMPLE 9

This example was carried out exactly as in Example 7 except that no special chain-terminator was added. An extremely viscous, bright, clear polymer dope was formed. When spun as before with a jet stretch of 1.0, a cascade stretch of 0.9, and a hot-shoe temperature of 350°C., fibers having the following properties (t/e/m) were produced: 6.3 gpd/2.5%/333 gpd.

The tensile property values (e.g., tenacity and modulus) recited in the examples for the fibers can be substantially increased by conventional techniques; for example, by further stretching, annealing and/or other secondary heat-treatments of the fibers and/or by modification of the spinning conditions recited in the examples.

EXAMPLE 10

This experiment illustrates the preparation of a copolymer containing about 90 mole percent of the repeating unit

and about 10 mole percent of the repeating unit

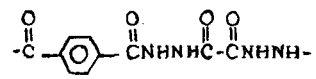

Using the same apparatus as used in Example 2, TDH (13.095g., 0.0675M) and 0.885g. (0.0075 mole) of oxalic dihydrazide were added to 400 ml DMAc/5% LiCl and dissolved at 50°C.

The reaction mixture, cooled to 0°C., was stirred at about 650 rpm and TCL (15.225g., 0.075M) was added followed by a rinse of 200 ml DMAc/5% LiCl. Stirring was continued for 1 hour with the ice bath surrounding the reaction vessel. Then, 5 g. of lithium hydroxide hydrate mixed in about 12 ml of water was added with further stirring. A bright, viscous polymer solution formed which, after two days at room temperature, was unchanged. Polymer inherent viscosity was 8.69.

The polymer solution was spun into fibers as described in Example 7, using a 6-hole, 7-mil spinneret, a jet-stretch of 1.0, a cascade-stretch of 1.0 and a hot-stretch at 320°C. of 1.53 to give fibers having properties (t/e/m) of 6.8 gpd/2.7%/352 gpd.

EXAMPLE 11

Example 1, Part B, of U.S. Pat. No. 3,536,651 was substantially duplicated. The final reaction product obtained was a slurry or paste that was unsuitable for direct spinning to fibers.

A 500 ml resin kettle, fitted with a stainless-steel helical stirrer, was thoroughly dried. The reactor was purged with dry nitrogen; the nitrogen blanket was maintained throughout the polymerization. Hexamethylphosphoramide containing 10 % dissolved lithium chloride (HPT/LiCl, 94 ml) was added to the reactor. All solvents had been dried over molecular sieves. TDH (2.78g., 0.0143 mole) was dissolved in the solvent. The solution was cooled to 25°C. by means of a water bath and TCL (1.02g., 0.0050 mole) was rinsed in with 28 ml of solvent. After 13 minutes stirring, TCL (0.94g., 0.0046 mole) was added, plus 46 ml of HPT/LiCl. The reaction mixture was stirred between additions. The viscosity of the reaction mixture began to increase after the second addition to TCL, to form a light yellow, translucent product. After the third increment of TCL had been added, the reaction product became opaque and took on the appearance and texture of petrolatum.

EXAMPLE 12

This example illustrates that hexamethylphosphoramide containing 5% dissolved LiCl (HPT/LiCl), a common amide-type solvent used in prior art processes, is not an effective solvent for use in carrying out the process described herein.

Using the apparatus described in Example 2, an attempt is made to prepare a solution of poly(terephthalic hydrazide) in HPT/LiCl. TDH (4.85g., 0.025 mole) was dissolved in 200 ml dry HPT/10%LiCl and the solution was cooled to 25°C. Then an equivalent quantity of TCL (5.075g., 0.025 mole) was added all at once and the helical stirrer was set at about 600 rpm. Eight minutes later a viscous, almost opaque, dope had formed, and water (5 ml) was added to this product. Stirring was continued, but there was no change in the appearance or consistency of the product. After 10 minutes, anhydrous lithium hydroxide (1.2g., 0.05 mole) was added, and the reaction mixture was stirred further. The product was an opaque paste, quite unsuitable for spinning to fibers.

EXAMPLE 13

This example illustrates that N-methyl pyrrolidone-2 containing 5% dissolved lithium chloride (NMP/LiCl) is an effective solvent for this invention.

The conditions of Example 12 were repeated exactly, except that the solvent was 200 ml of dry NMP/LiCl. Two minutes after the addition of the 5 ml of water to the translucent paste that was the reaction product, a clear bright dope of high viscosity was formed. This clear solution was neutralized with lithium hydroxide, and a portion of the viscous product was cast as a thin film on a glass plate. The film was immersed in water, peeled from the glass, allowed to soak in water for a short time, and finally blotted dry. This film was clear and tough.

EXAMPLE 14

This experiment illustrates the preparation of an unneutralized solution of poly(terephthalic dihydrazide) and the spinning of fibers therefrom.

Using the equipment described in Example 7, TDH (9.7g., 0.05 mole) was dissolved in 400 ml DMAc/5% LiCl at 50°C. The reaction mixture, cooled to 0°C., was stirred at about 700 rpm and TCL (10.15g., 0.05 mole) was added all at once. High-speed stirring was maintained for 15 minutes until a highly viscous, translucent gel had formed. Then water (10 ml, 61% based on weight of polymer) was added and stirring was continued until the viscous gel had been completely converted to a clear, bright, smooth-flowing spinning dope.

This solution was spun into fibers as described in Example 7, with a jet-stretch of 1.0, a cascade stretch of 1.0, and a hot-stretch of 1.33x over a hot shoe at 330°C. The resulting fiber had a tenacity of 5.8 gpd, a break elongation of 2.7%, and an initial modulus of 279 gpd.

We claim:

1. A process for preparing a polymer spinning solution comprising:
    a. forming a polymer gel by reacting and mixing substantially equimolar amounts of (1) terephthaloyl chloride and terephthalic dihydrazide or (2) terephthaloyl chloride and a mixture of terephthalic dihydrazide and up to 10 mole percent of the terephthalic dihydrazide reactant of at least one other monomer at a temperature between −15°C. and 100°C. and in the presence of a solvent for said polymer, said mixing is sufficient to keep said polymer in solution with said solvent until said gel is formed, wherein said other monomer is selected from the group consisting of

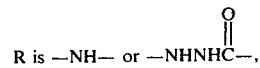

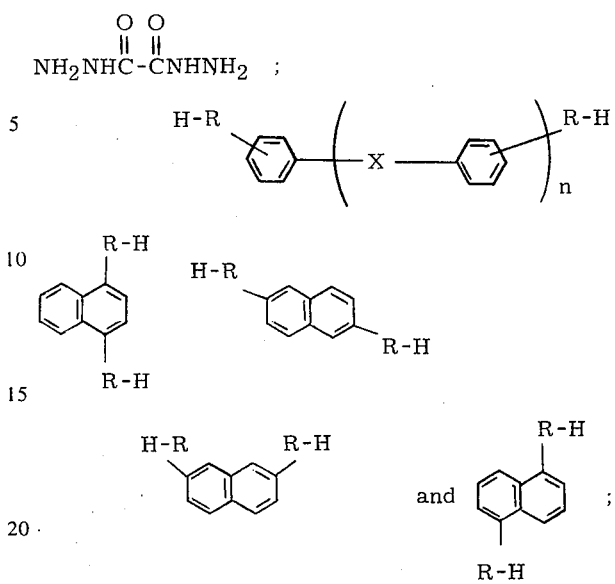

wherein the bonds of each phenylene ring are meta or para oriented to one another, R is

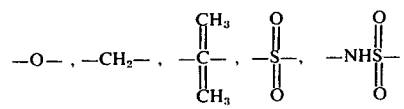

$n$ is zero or one and X is a covalent bond or a divalent radical selected from the group consisting of

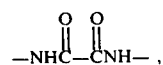

and $$-NH\overset{O}{\underset{\|}{C}}-\overset{O}{\underset{\|}{C}}NH-,$$

wherein said solvent contains from 2 to 7% by weight of lithium chloride dissolved therein and is selected from the group consisting of N,N-dimethylacetamide, N-methylpyrrolidone-2 and mixtures thereof;
    b. adding a small amount of water or organic hydroxyl compound selected from the group consisting of methyl alcohol, ethyl alcohol, isopropyl alcohol and ethylene glycol to said gel; and
    c. further mixing of said gel until a clear polymer solution is obtained;
said process being characterized in that sufficient amounts of reactants are employed to provide a polymer spinning solution having a viscosity between 1,000 and 40,000 poise and containing at least 3.0 percent by weight of polymer having an inherent viscosity of at least 3.0.

2. The process of claim 1, wherein the process is carried out at a temperature between 0°C. and 60°C.

3. The process of claim 1, wherein said reactants are terephthaloyl chloride and terephthalic dihydrazide.

4. The process of claim 1, wherein said reactants are terephthaloyl chloride, terephthalic dihydrazide and oxalic dihydrazide.

5. The process of claim 1, wherein said reactants are terephthaloyl chloride, terephthalic dihydrazide and 4,4'-methylene dianiline.

6. The process of claim 1, wherein said solvent is N,N-dimethylacetamide.

7. The process of claim 1, wherein the reaction is carried out in the presence of a chain terminator.

8. The process of claim 1, wherein said polymer has an intrinsic viscosity of at least 4.0.

* * * * *